(12) United States Patent  
Meyers

(10) Patent No.: US 9,122,455 B2  
(45) Date of Patent: Sep. 1, 2015

(54) INFORMATION HANDLING SYSTEM HOUSING LID WITH SYNCHRONIZED MOTION PROVIDED BY UNEQUAL GEARS

(71) Applicant: Dell Products L.P., Round Rock, TX (US)

(72) Inventor: David M. Meyers, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 14/087,858

(22) Filed: Nov. 22, 2013

(65) Prior Publication Data

US 2015/0146362 A1   May 28, 2015

(51) Int. Cl.
*G06F 1/16* (2006.01)
*E05D 3/12* (2006.01)

(52) U.S. Cl.
CPC .............. *G06F 1/1681* (2013.01); *E05D 3/122* (2013.01)

(58) Field of Classification Search
USPC .......... 206/363, 438, 63.5, 45.21, 45.23, 297; 361/679.27, 679.09, 679.03, 679.17, 361/679.06, 679.56, 679.07, 679.22, 361/679.01, 679.15, 679.37, 679.02, 361/679.23, 679.55, 679.08, 679.12, 361/679.28, 679.26, 679.52; 455/90.3, 455/575.3, 566, 575.4, 575.1, 575.8; 16/302, 366, 237, 340, 367, 352, 354, 16/321, 330, 286, 388, 223; 345/633, 8, 345/169, 184, 156, 1.3, 1.1, 168, 204, 161, 345/905; 248/363, 438, 63.5, 45.21, 45.23, 248/297
See application file for complete search history.

(56) References Cited

U.S. PATENT DOCUMENTS

2004/0203535 A1* 10/2004 Kim et al. ..................... 455/90.3
2013/0322004 A1* 12/2013 Park ......................... 361/679.27
2015/0016040 A1*  1/2015 Hood et al. .............. 361/679.27

* cited by examiner

*Primary Examiner* — Hung Duong
(74) *Attorney, Agent, or Firm* — Terrile, Cannatti, Chambers & Holland, LLP; Robert W. Holland

(57) ABSTRACT

An information handling system converts from a closed position to a tablet position by rotating a lid with a display 360 degrees about a hinge having motion translated between lid and housing portions through first and second engage gears of different diameters. The hinge has first and second axles held in a spaced and substantially parallel orientation by a support with first and second gears having a gear ratio of substantially 2.54 to 1. Overall system thickness is reduced by having a lid portion gear with a diameter of substantially the thickness of the lid portion and a housing portion gear with a diameter of substantially the thickness of the housing portion.

20 Claims, 4 Drawing Sheets

INFORMATION HANDLING SYSTEM HOUSING LID WITH SYNCHRONIZED MOTION PROVIDED BY UNEQUAL GEARS

BACKGROUND OF THE INVENTION

1. Field of the Invention

The present invention relates in general to the field of information handling system housings, and more particularly to an information handling system housing lid with synchronized motion provided by unequal.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in housings having a variety of configurations. A traditional clamshell configuration has a lid rotationally coupled to a main chassis portion so that the lid articulates between open and closed positions. In the open position, the lid rotates approximately 90 degrees to expose a display that presents visual information provided by processing components disposed in the main chassis portion. In the closed position, the lid rotates to bring the display against the main chassis portion to provide portability. Although conventional clamshell configurations provide ease of use and convenience, when the lid is free to rotate the display supported by the lid generally does not offer a firm enough platform for accepting touchscreen inputs. For this and other reasons, portable information handling systems that include a touchscreen display in an articulating lid generally provide rotation to a tablet-type of configuration in which the lid is supported to remain stationary during touch interfaces. For example, one option is to rotate the lid from the closed position for 360 degrees so that the display is exposed like a tablet and resting against the bottom surface of the main chassis portion.

One difficulty with rotation of an information handling system lid for 360 degrees relative to a housing is that the hinge used to perform the rotation has to allow the lid to rest flat relative to both the upper and lower surfaces of the housing. Although a relatively large hinge can include movement of the lid relative to the housing so that flat alignment to an upper and lower surface is provided, end user's generally prefer to have portable information handling systems with a small form factor. One alternative that provides full rotation is the use of a double hinge so that motion is provided at an axis proximate to the lid and an axis proximate the housing. The lid opens to expose the display by rotating about the axis proximate the lid and rotates to an opposite surface of the housing about the axis proximate the housing. A difficulty with existing hinge designs is that the size of the hinge tends to increase the size of the information handling system housing. In particular, the total height of the system tends to increase with a dual axis hinge for a number of reasons. For example, manufacture constraints tend to increase the size of a hinge so that the hinge will readily assemble into a housing and withstand the forces applied repeatedly over time by the opening and closing of an information handling system lid relative to a housing. The demands of operational use tend to drive complex hinge designs with multiple moving parts, which tends to increase both the size and thickness of the hinge and information handling system housing.

SUMMARY OF THE INVENTION

Therefore a need has arisen for a system and method which provides full rotational movement of a lid relative to a housing for conversion of a portable information handling system to and from a tablet configuration in a thin form factor.

In accordance with the present invention, a system and method are provided which substantially reduce the disadvantages and problems associated with previous methods and systems for rotation of an information handling system lid relative to a housing. A hinge has a reduced form factor in a vertical footprint by using gears of different diameters to translate rotational movement between lid and housing portions of the information handling system. The gears have a gear ratio adjusted based upon a start and stop angle orientation so that the lid and housing rotate through 360 degrees to support movement between closed and tablet configurations.

More specifically, an information handling system processes information with components disposed in a housing, such as a processor and memory, and presents the information as visual images at a display disposed in a lid. The lid rotates substantially 360 degrees relative to the housing between a closed position and a tablet position. A hinge couples the lid to the housing with a first axle coupled to the lid and a second axle coupled to the housing. Movement of each axle is translated to the other through first and second gears held in position by a support. In one embodiment, the first gear has a diameter of greater than twice the second gear, with the different sized gears providing a lower overall height of the hinge. In an alternative embodiment, the diameter of the gear fixedly coupled to the lid axle is substantially the same as the height of the lid and the diameter of the gear fixedly coupled to the housing axle is substantially the same as the height of the housing. In another embodiment, the gears have a starting position offset from vertical relative to the housing and lid to reduce the vertical footprint of the information handling system. The gear ratio of the different-sized gears is set based upon gear size and offset angle to provide substantially 360 degrees of movement of the lid relative to the housing for transitioning between closed and tablet positions.

The present invention provides a number of important technical advantages. One example of an important technical advantage is that full rotational movement is provided for a lid relative to a housing during conversion of a portable information handling system to and from a tablet configuration. With only two gears interacting in each hinge, a relatively simple and contained hinge assembly provides reliable use over time and ready assembly during system manufacture. The use of different sized gears reduces the vertical footprint of a convertible information handling system. A gear ratio set to ensure 360 degrees of movement of the lid and housing portions of a convertible information handling system adapts to the different sized gears and any offset angle associated with the gears in closed and tablet positions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system rotates a lid relative to a housing between closed and tablet positions with a two-axle hinge having rotational movement translated between the axles by gears of different sizes. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
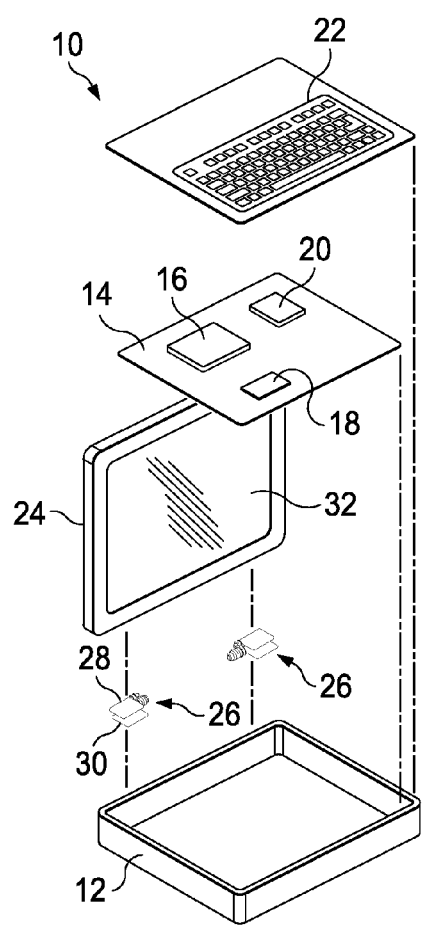
FIG. 1 depicts a blow-up view of a portable information handling system that processes information in a tablet configuration.

Referring now to FIG. 1, a blow-up view depicts a portable information handling system 10 that processes information in a tablet configuration. Portable information handling system 10 has a housing 12 that supports components to perform processing of information, such as a motherboard 14 that interfaces a CPU 16, RAM 18 and a chipset 20. Once motherboard 14 is assembled in housing 12, a keyboard 22 is placed over the components and interfaced with the chipset to accept end user inputs. A lid 24 rotationally couples with housing 12 by first and second hinges 26. Each hinge 26 includes a lid coupler 28 that couples hinge 26 to lid 24 and a housing coupler 30 that couples hinge 26 to housing 12. A display 32 disposed in lid 24 interfaces with components disposed in housing 12 to present information as visual images. Display 32 rotates with lid 24 and includes a touchscreen that accepts touch inputs so that an end user can change the position of display 32 as desired to view information and make touch inputs. In alternative embodiments, alternative types of configurations may be used for housing 12, lid 24 and hinges 26. For instance, instead of using two separate hinges 26, one continuous hinge may be used. Hinges 26 may be disposed in alternative locations as desired to rotate housing 12 and lid 24 relative to each other. The example information handling system configuration depicted by FIG. 1 is not meant to limit the motion of hinge 26 in alternative types of housings and devices, such as a device that includes a touch screen display in both the lid and housing portions.

Figure 2A:
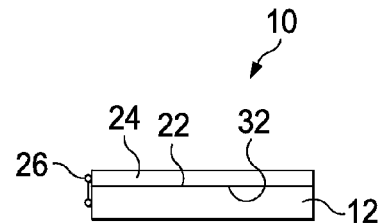
FIGS. 2A, 2B, 2C and 2D depict the portable information handling system in closed, clamshell, flat and tablet configurations respectively.
Figure 2B:
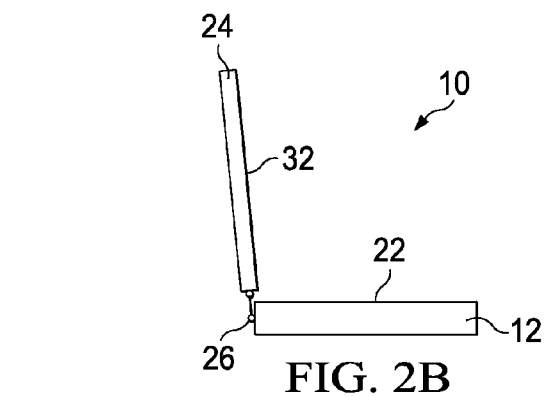
Figure 2C:
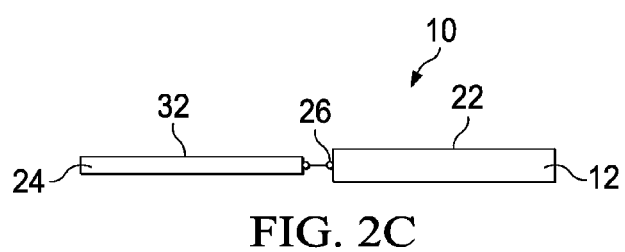
Figure 2D:
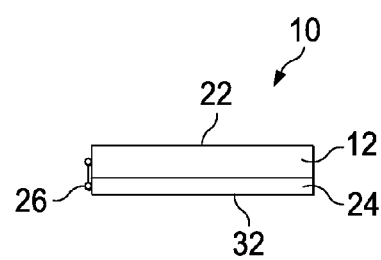

Referring now to FIGS. 2A, 2B, 2C and 2D, the portable information handling system 10 is depicted in closed, clamshell, flat and tablet configurations respectively. FIG. 2A depicts lid 24 rotated to a closed position so that display 32 is protected and resting against keyboard 22. FIG. 2B depicts lid 24 rotated substantially 90 degrees about hinge 26 relative to housing 12 to an open clamshell configuration having display 32 presented to an end user for viewing and keyboard 22 presented to an end user for accepting inputs. FIG. 2C depicts lid 24 rotated substantially 180 degrees about hinge 26 relative to housing 12 to a flat configuration. In a flat configuration, hinge 26 aligns lid 24 and housing 12 to have a level surface so that an embodiment having a display in lid 24 and housing 12 will appear as a flat unit. FIG. 2D depicts lid 24 rotated substantially 360 degrees about hinge 26 relative to housing 12 to a tablet configuration. In FIG. 2D, lid 24 rotates to a position underneath housing 12 to expose display 32 at the bottom of housing 12 and keyboard 22 at the top of housing 12. To use information handling system 10 as a tablet, the end user flips housing 12 to expose display 32 on top and makes inputs to the touchscreen.

Figure 3:
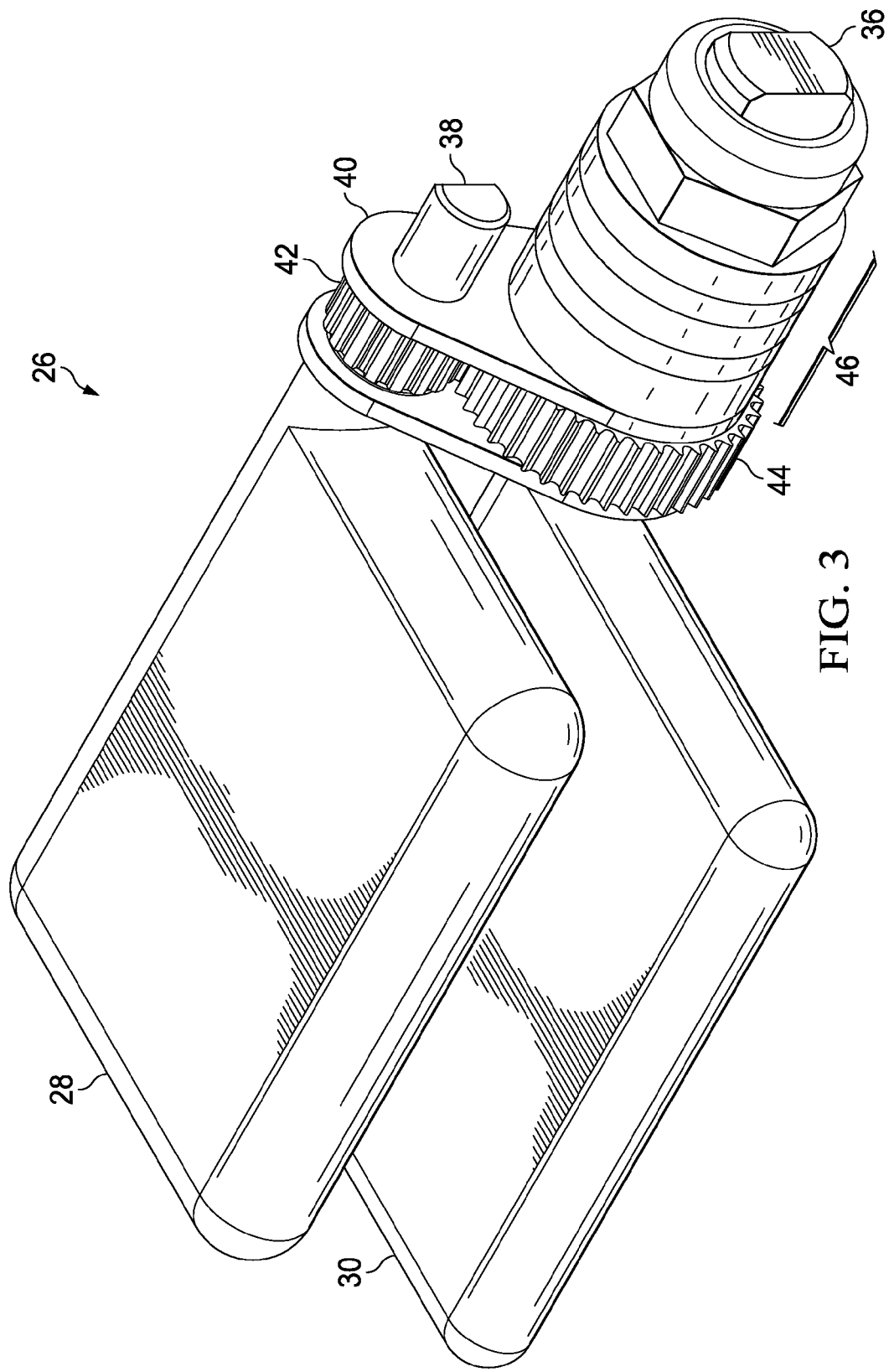
FIG. 3 depicts a side perspective view of a hinge for rotationally coupling the portable information handling system lid and housing to translate rotational motion between each other with a reduced height form factor.

Referring now to FIG. 3, a side perspective view depicts a hinge 26 for rotationally coupling the portable information handling system 10 lid 24 and housing 12 to translate rotational motion between each other with a reduced height form factor. Hinge 26 has a first housing axle 36 and a second lid axle 38 held in a substantially parallel configuration by a support 40. First housing axle 36 terminates at housing coupler 30 that couples to a housing portion and second lid axles 38 couples to a lid coupler 28 that couples to a lid portion. Axles 36 and 38 rotate within support 40 about spaced and substantially parallel axes relative to each other. Rotation of axles 36 and 38 results in translation of motion relative to each other by interaction of a lid gear 42 and a housing gear 44 held in contact with each other by support 40. A spring washer assembly 46 couples to housing axle 36 and selectively tightens to introduce friction that manages torque needed to rotate lid gear 42 and housing gear 44.

In the example embodiment depicted by FIG. 3, lid gear 42 and housing gear 44 integrated in support 40 translate force applied to one of axles 36 or 38 to the other of axles 36 or 38. Lid coupler 28 and housing coupler 30 rotate relative to each other in a controlled manner responsive to forces translated through lid gear 42 and housing gear 44. Support 40 maintains lid gear 42 and housing gear 44 in position relative to each other so that translated rotational force allows substantially 360 degrees of rotation of lid coupler 28 relative to housing coupler 30. In the example embodiment, housing gear 44 has a diameter of greater than twice the diameter of lid gear 42. The smaller diameter of lid gear 42 relative to housing gear 44 allows hinge 26 to embed within information handling system 10 without increasing the height of the system. For example, lid gear 42 has a diameter substantially equal to the height of a lid portion so that lid gear 42 is disposed within the lid portion. Similarly, housing gear 44 has a diameter substantially equal to the height of a housing portion so that housing gear 44 is disposed within the housing portion. Alternatively, the diameters of the housing and lid gears are selected so that a desired overall height of the information handling system is established. Once the height of each gear is established, a gear ratio is established that provides 360 degrees of rotation of the lid relative to the housing within the available vertical form factor.

Figure 4:
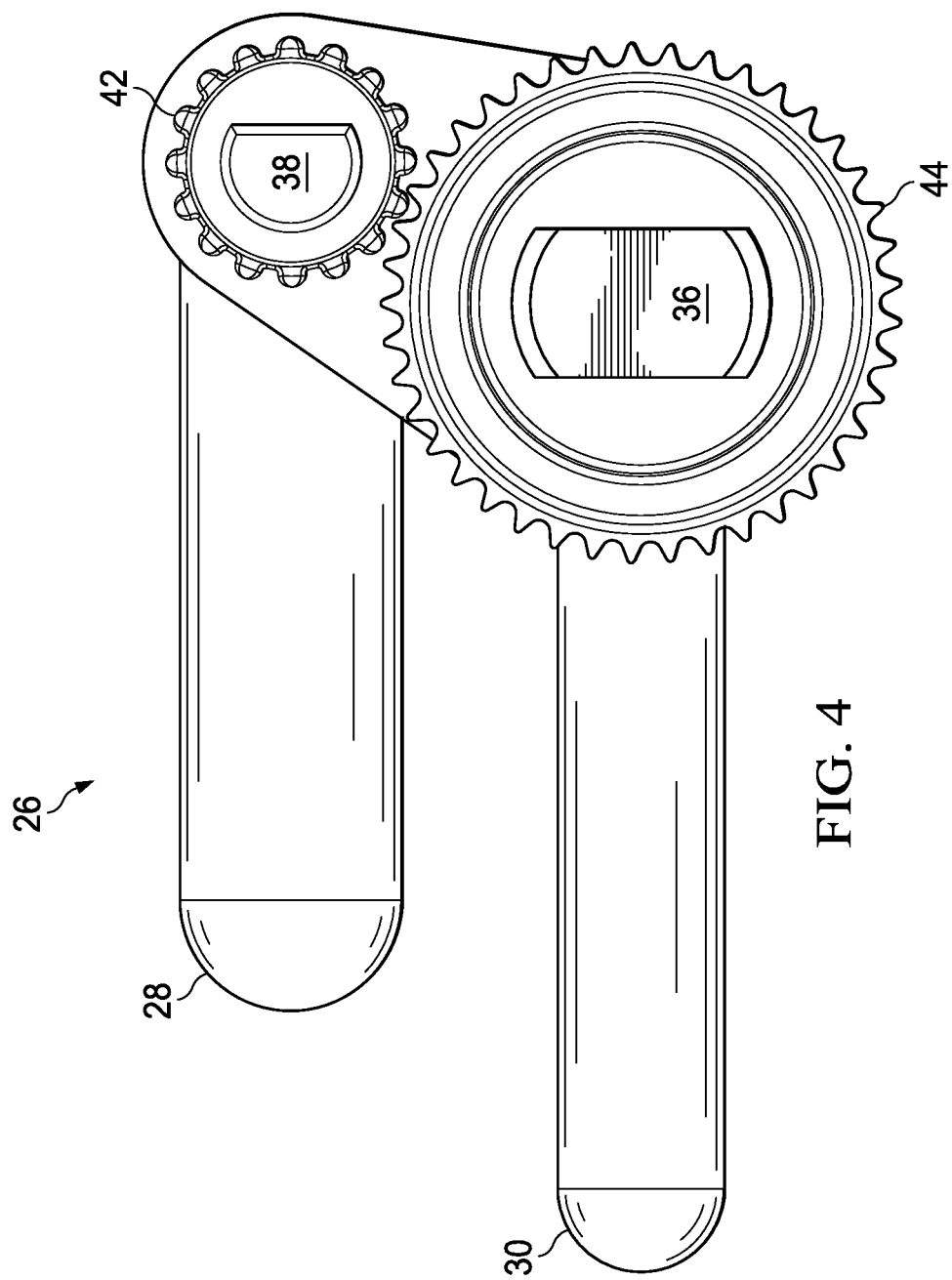
FIG. 4 depicts a side view of the hinge of FIG. 3 with the gears deployed at a start angle offset to vertical.

Referring now to FIG. 4, a side view depicts the hinge of FIG. 3 with the gears deployed at a start angle offset to vertical. In the example embodiment, a gear ratio of 2.54 to 1 is used so that lid coupler 28 in a closed position relative to housing coupler 30 is disposed approximately 4.7 mm above housing coupler 30 and rotates substantially 360 degrees to bring lid coupler 28 below housing coupler 30. By comparison, a similar geared hinge with equal diameter-sized gears would result in a height of approximately 7.3 mm. The use of a start position having lid gear 42 offset from vertical relative to housing gear 30 provides a further reduction in overall system height. The gear ratio, defined as the number of gear teeth of housing gear 44 divided by the number of gear teeth of lid gear 42, is set by determining the angle of rotation of lid gear 42 about housing gear 44 to bring lid coupler 28 parallel to but below housing coupler 30. The angle of rotation in the example embodiment is decreased somewhat by the offset angle of the start position. In one alternative embodiment, offset angles at both the start position and the stop position reached after 360 degrees of relative rotation of couplers 28 and 30 allow a reduced hinge height and reduced gear travel to achieve closed and tablet positions. Other considerations that may impact gear size and gear ratio selection include the type of feel desired during movement of the lid portion relative to the housing.

Figure 5:
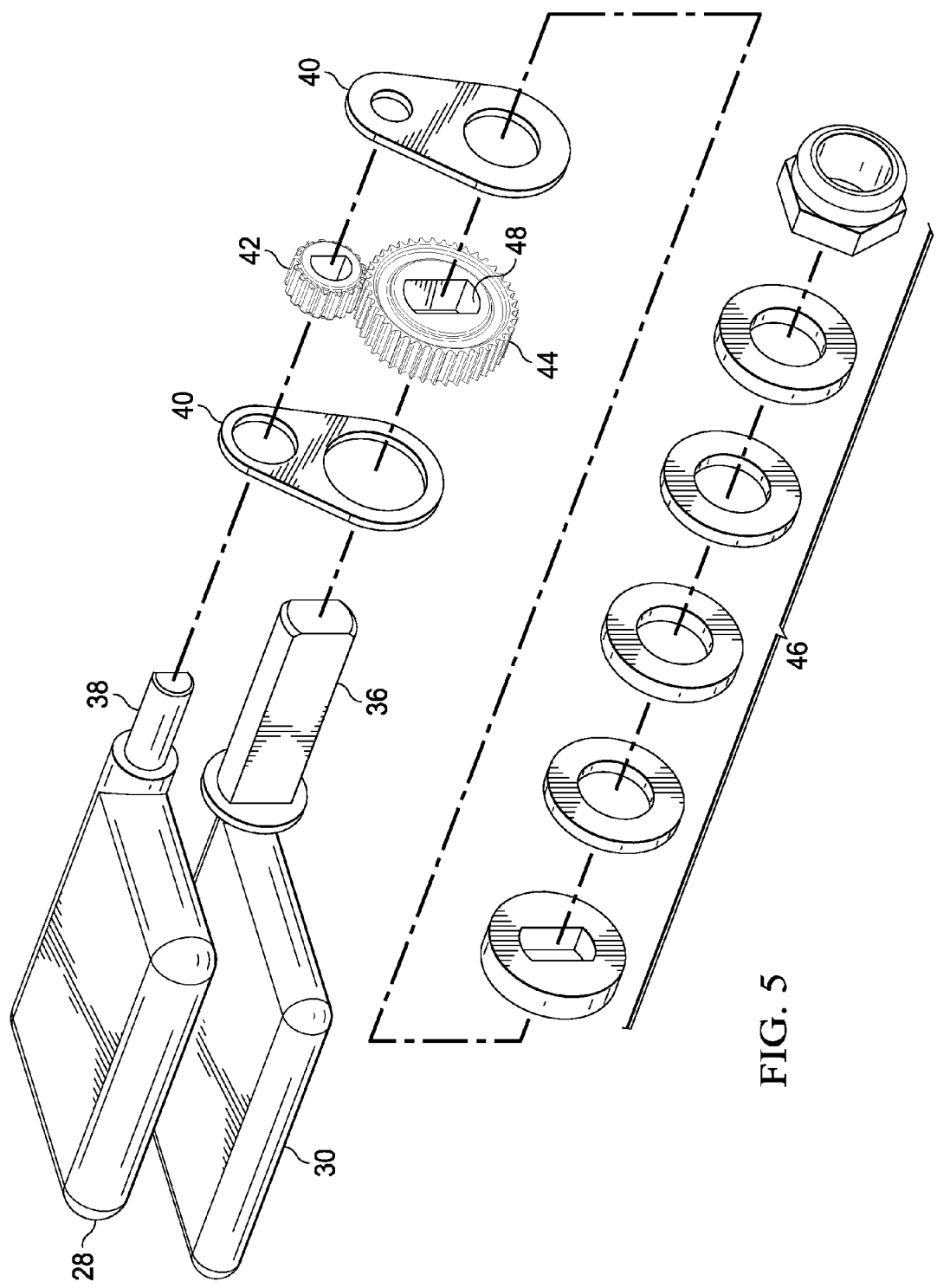
FIG. 5 depicts a blow up view of a disassembled hinge for rotationally coupling the portable information handling system lid and housing.

Referring now to FIG. 5, a blow up view depicts a disassembled hinge 26 for rotationally coupling the portable information handling system lid and housing. The disassembled hinge has a lid coupler 28 and housing coupler 30 for ready assembly to an information handling system's lid and housing portions. Lid coupler 28 and housing coupler 30 extend from axles 38 and 36 respectively and into gears 42 and 44 so that the rotational position of couplers 28 and 30 match the rotational position of gears 42 and 44. For example, each axle 38 and 36 terminates with a shape formed to fixedly engage with the interior portion of its respective gear 42 or 44. Support 40 has opposing planar portions that couple around gears 42 and 44 to hold gears 42 and 44 rotationally engaged with each other through 360 degrees of motion. Openings formed in the opposing planar portions of support 40 engage with a ring 48 formed in each gear 42 and 44 to maintain alignment of axles 36 and 38, gears 42 and 44, and support 40. An assembled hinge 26 provides ease of manufacture for a convertible information handling system by reducing the need for assembly and calibration of hinge components during manufacture of the information handling system. The assembled hinge 26 fits into an information handling system as a unit, thus simplifying system manufacture.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   components disposed in the housing and operable to cooperate to process information;
   a lid;
   a display disposed in the lid, the display interfaced with the components to present the information as visual images;
   a hinge rotationally coupling the housing and lid, the hinge having a first axle coupled at an end to the housing, a second axle coupled at an end to the lid, a support holding the first and second axles distal each other, the first axle coupled to a first gear disposed in the support, the second axle coupled to a second gear disposed in the support, the first and second gears engaged with each other to translate motion between the first and second axles, the first gear having greater than twice the diameter of the second gear.

2. The information handling system of claim 1 wherein the gear ratio of the first and second gears is substantially 2.54 to 1.

3. The information handling system of claim 2 wherein the first and second gears comprise machined stainless steel.

4. The information handling system of claim 3 further comprising a spring washer coupled to the first axle to provide torque control for rotation of the first and second axles.

5. The information handling system of claim 1 wherein the support comprises first and second planar portions enclosing the first and second gears to maintain an interlocking relationship through substantially 360 degrees of rotation.

6. The information handling system of claim 1 wherein a ratio of the diameter of the first gear to the second gear is substantially equal to a ratio of a thickness of the housing to a thickness of the lid.

7. The information handling system of claim 1 wherein a diameter of the first gear is substantially equal to a thickness of the housing and a diameter of the second gear is substantially equal to a thickness of the lid.

8. The information handling system of claim 1 wherein the hinge rotates the lid substantially 360 degrees relative to the housing.

9. A method for rotating an information handling system lid relative to a housing, the method comprising:
   coupling a first axle to the housing;
   coupling a second axle to the lid;
   coupling a first gear to the first axle;
   coupling a second gear to the second axle; and
   supporting the first and second gears to engage with each other through a full rotation of the lid relative to the housing;
   wherein the first gear has greater than twice the diameter of the second gear.

10. The method of claim 9 wherein the gear ratio of the first and second gears is substantially 2.54 to 1.

11. The method of claim 10 wherein the first and second gears comprise machined stainless steel.

12. The method of claim 9 further comprising coupling a spring washer to one of the first or second gears to provide torque control for rotation of the first and second axles.

13. The method of claim 9 wherein supporting the first and second gears to engage with each other through a full rotation of the lid relative to the housing further comprises:
   coupling a first planar portion to a first side of the first and second gears, the first planar portion substantially perpendicular to the first and second axles; and
   coupling a second planar portion to a second side of the first and second gears, the second planar portion substantially perpendicular to the first and second gears, the first and second planar portions cooperating to maintain the first and second gears engaged with each other.

14. The method of claim 9 wherein a ratio of the diameter of the first gear to the second gear is substantially equal to a ratio of a thickness of the housing to a thickness of the lid.

15. The method of claim 9 wherein a diameter of the first gear is substantially equal to a thickness of the housing and a diameter of the second gear is substantially equal to a thickness of the lid.

16. A hinge for rotating an information handling system lid and housing relative to each other, the hinge comprising:
 a first axle adapted to couple to the housing;
 a second axle adapted to couple to the lid;
 a support holding the first and second axles in a spaced relationship; and
 first and second gears disposed in the support to engage with each other to translate motion between the axles for substantially 360 degrees of rotation of the housing relative to the lid, the first gear having at least twice the diameter of the second gear.

17. The hinge of claim 16 wherein the gear ratio of the first and second gears is substantially 2.54 to 1.

18. The hinge of claim 17 wherein only the first and second gears translate motion between the axles so that no intervening gears are disposed between the first and second gears.

19. The hinge of claim 17 wherein a ratio of the diameter of the first gear to the second gear is substantially equal to a ratio of a thickness of the housing to a thickness of the lid.

20. The hinge of claim 17 wherein a diameter of the first gear is substantially equal to a thickness of the housing and a diameter of the second gear is substantially equal to a thickness of the lid.

\* \* \* \* \*